United States Patent Office 3,498,983
Patented Mar. 3, 1970

3,498,983
7,8-DIHYDROXYBENZO[g]PTERIDINE-6,9-DIONES AND DERIVATIVES
Gerhard R. Wendt, Havertown, and Kurt W. Ledig, Philadelphia, Pa., assignors to American Home Products Corporation, New York, N.Y., a corporation of Delaware
No Drawing. Filed Apr. 12, 1968, Ser. No. 721,074
Int. Cl. C07d 57/28
U.S. Cl. 260—251.5          2 Claims

ABSTRACT OF THE DISCLOSURE 7,8 - dihydroxybenzo[g]pteridine-6,9-diones, optionally substituted in the 2-position with hydroxyl, aryl, halo, alkoxy, alkylthio, alkylamino, dialkylamino, cycloalkylamino or halophenylamino and in the 4-position with hydroxyl, halo or alkyl (I) and their salts are prepared by condensing a 4,5-diaminopyrimidine (II) with rhodizonic acid (III) and, if desired, forming a salt of the product. Compounds (I) are pharmacologically active, especially as anti-inflammatory agents.

This invention relates to benzopteridine derivatives and more particularly to substituted benzo[g]pteridine-6,9-diones showing pharmacological activity, and with a method for their preparation.

DESCRIPTION OF THE INVENTION

The compounds contemplated by this invention are those of Formula I:

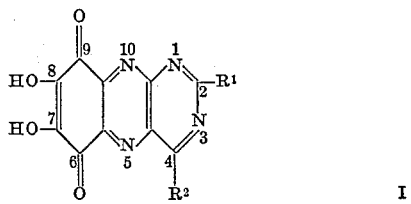

wherein $R^1$ is hydrogen, hydroxyl, aryl, preferably phenyl, halo, (lower)alkyl, preferably methyl, (lower)alkoxy, (lower)alkylthio, mono(lower)alkylamino, di(lower)alkylamino, cyclo(lower)alkylamino or halophenylamino; and $R^2$ is hydrogen, hydroxyl, halo, or (lower)alkyl, preferably methyl; or a non-toxic, pharmaceutically-acceptable salt of said compound with a base.

Special mention is made of a valuable embodiment of this invention which is the compound 4,7,8-trihydroxy-benzo[g]pteridine-6,9-dione, a compound of Formula I wherein $R^1$ is hydrogen and $R^2$ is hydroxyl.

When used herein and in the appended claims, the term "(lower)alkyl" contemplates hydrocarbon radicals, straight and branched chain, containing from about 1 to about 6 carbon atoms, illustrative members of which are methyl, ethyl, n-propyl, i-propyl, n-butyl, t-butyl, n-pentyl, n-hexyl, and the like. $R^1$ can also be generally any hydrocarbon aryl group of from about 6 to about 12 carbon atoms, but phenyl is preferred. "Halo" includes chloro, bromo, fluoro and iodo, preferably chloro and bromo. "(Lower) alkoxy" includes straight and branched chain groups of from 1 to 6 carbon atoms such as methoxy, ethoxy, i-propoxy, n-hexyloxy and the like. "(Lower)alkylthio" includes straight and branched chain groups of from 1 to 6 carbon atoms such as methylthio, ethylthio, i-propylthio, n-hexylthio and the like. "Cyclo(lower)alkylamino" includes groups of from 3 to 6 carbon atoms such as cyclopropylamino and cyclohexylamino. "Halophenylamino" includes chlorophenylamino, bromophenylamino, iodophenylamino and the like.

The compounds of Formula I of this invention and their salts have demonstrated pharmacological activity. In particular they have been found to have anti-inflammatory action when tested under standard and accepted pharmacological procedures in animals, such as mice and rats. They are, therefore, deemed to possess utility in experimental and comparative pharmacology and are of value to treat conditions in animals, such as valuable domestic animals, such as horses, dogs and cats, and in laboratory animals, such as mice, rats and the like, responsive to treatment with anti-inflammatory agents, such as inflammations and edemae.

The compounds of Formula I are prepared by reacting a 4,5-diamino-pyrimidine (II) or a salt thereof, such as the sulfate, with a rhodizonic acid (III) or a salt thereof such as the dipotassium salt, in the presence of an acid, such as a mineral acid, for example, sulfuric acid, in accordance with the following reaction scheme:

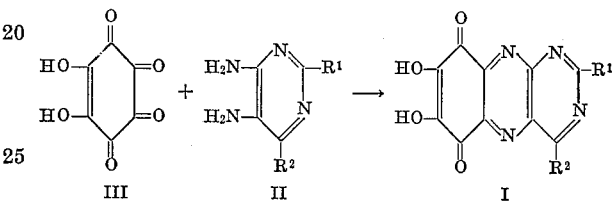

wherein $R^1$ and $R^2$ are as defined hereinabove. In one convenient manner of proceeding, the compound of Formula II is suspended in about 10 parts by weight of 2 N sulfuric acid and to this is added the stoichiometrical amount (an excess will do) of rhodizonic acid dipotassium salt dissolved in about 15 parts by weight of 2 N sulfuric acid. The reaction takes place smoothly at moderate temperatures, e.g., from about 10° C. to about 75° C. and preferably at about 22° C., where it is substantially complete in from about 30 minutes to about 4 hours. The product usually precipitates from the reaction mixture from which it can be recovered, for example, by filtration.

Since the compounds of Formula I of this invention are acidic (by virtue of the hydroxyl groups) advantage may be taken of the water solubility of salts of these compounds formed with bases in the isolation and/or purification of the instant compounds and in the preparation of solutions or micronized suspensions of the new compounds for parenteral administration. Suitable bases for forming the instant pharmaceutically-acceptable non-toxic salts are alkali metal and alkaline earth metal hydroxides, carbonates, bicarbonates and the like, such as sodium hydroxide, sodium carbonate, sodium bicarbonate, potassium hydroxide, lithium hydroxide, calcium carbonate, and the like and amines, such as ammonia and non-toxic primary, secondary and tertiary aliphatic and aromatic amines containing from about 1 to about 16 carbon atoms such as, for example, methylamine, ethylamine, n-hexylamine, benzylamine, dibenzylethylenediamine, and the like. The salts can be prepared by commonly used techniques, for example, by reacting the compound of Formula I with a stoichiometrical amount of the desired base in aqueous suspension, alcoholic solution, acetone and the like, then concentrating the solution.

Reactants of Formulae II and III are known compounds, many of which are available from commercial sources. Others which are not commercially available can easily be prepared in accordance with standard procedures well known to those skilled in the art. For example, 4,5-diamino-6-methylpyrimidine is shown in Ber. 34, 1246 (1901) by S. Gabriel and L. Colman; 4,5-diamino-6-hydroxy-2-methylpyrimidine is shown in Ann. 432, 287 (1923); 4,5-diaminopyrimidine is commercially available and 4,5-diamino-6-hydroxy-2-phenylpyrimidine is shown in Ber., 37, 2270 (1904); 4,5-diamino-2,6-dihydroxypyrimidine is commercially available and 4,5-diamino-2-hydroxypyrimidine is shown in Am. Chem. J. 36, 170 (1906).

The compounds of Formula I of this invention and their salts may be administered either alone or in combination with other pharmacologically-active ingredients. Whether singly or in combination, it is preferred that they be administered in liquid form as a suspension or solution in a suitable non-toxic or inert vehicle for parenteral use. By way of illustration pharmacological action is anti-inflammatory agents in rats has been demonstrated when a compound of this invention was administered at a dosage of 50 mg./kg., I.P.

Example 1.—4,7,8-trihydroxybenzo[g]pteridine-6,9-dione

A solution of 5.0 g. of 4,5-diamino-6-hydroxypyrimidine sulfate in 50 ml. of 2 N sulfuric acid is added to a solution of 5.3 g. of rhodizonic acid dipotassium salt in 50 ml. of 2 N sulfuric acid. The reaction mixture is stirred for 30 minutes and after being allowed to stand for about 16 hours at about 22° C., the precipitated product is filtered washed with water and dried to obtain the crystalline hydrate, M.P., >300° C.

Analysis.—Calcd. for $C_{10}H_4N_4O_5 \cdot H_2O$ (percent): C, 43.17; H, 2.17; N, 20.14. Found (percent): C, 42.74; H, 2.62; N, 19.90.

The base is converted to the sodium salt by dissolving the base in a stoichiometrical amount of aqueous sodium bicarbonate and evaporating the mixture to dryness to leave the salt as a residue. In the same manner are prepared the corresponding potassium, lithium, calcium and magnesium salts. Treatment of the base in isopropanol solution with a methanolic solution of the corresponding amine provides the ammonium, methylammonium, ethylammonium n-hexylammonium, benzylammonium and dibenzylethylenediammonium salts after evaporation of the solvents.

Example 2.—7,8-dihydroxy-4-methylbenzo[g]-pteridine-6,9-dione

The procedure of Example 1 is repeated substituting for the 4,5-diamino-6-hydroxypyrimidine a stoichiometrical amount of 4,5-diamino-6-methylpyrimidine and the product is obtained.

Example 3.—4,7,8-trihydroxy-2-methylbenzo[g]-pteridine-6,9-dione

The procedure of Example 1 is repeated substituting for the 4,5-diamino-6-hydroxypyrimidine a stoichiometrical amount of 4,5-diamino-6-hydroxy-2-methylpyrimidine and the product is obtained.

Example 4.—7,8-dihydroxybenzo[g]pteridine-6,9-dione

The procedure of Example 1 is repeated substituting for the 4,5-diamino-6-hydroxypyrimidine a stoichiometrical amount of 4,5-diaminopyrimidine and the product is obtained.

Example 5.—4,7,8-trihydroxy-2-phenylbenzo[g]-pteridine-6,9-dione

The procedure of Example 1 is repeated substituting for the 4,5-diamino-6-hydroxypyrimidine a stoichiometrical amount of 4,5-diamino-6-hydroxy-2-phenylpyrimidine and the product is obtained.

Example 6.—2,4,7,8-tetrahydroxybenzo[g]pteridine-6,9-dione

The procedure of Example 1 is repeated substituting for the 4,5-diamino-6-hydroxypyrimidine a stoichiometrical amount of 4,5-diamino-2,6-dihydroxypyrimidine and the product is obtained.

Example 7.—2,7,8-trihydroxybenzo[g]pteridine-6,9-dione

The procedure of Example 1 is repeated substituting for the 4,5-diamino-6-hydroxypyrimidine a stoichiometrical amount of 4,5-diamino-2-hydroxypyrimidine and the product is obtained.

EXAMPLE 8

The procedure of Example 1 is repeated substituting for the 4,5-diamino-6-hydroxpyrimidine, stoichiometrical amounts of the following 4,5-diaminopyrimidines:

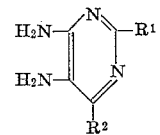

| $R^1$ | $R^2$ |
|---|---|
| OH | $CH_3$ |
| H | Cl |
| Cl | $CH_3$ |
| $CH_3$ | H |
| $CH_3$ | $CH_3$ |
| $SCH_3$ | H |
| $OC_2H_5$ | $CH_3$ |
| $NHCH_3$ | H |
| $N(CH_3)_2$ | H |
| —NH—⟨⟩ | H |
| —NH—⟨⟩—Br | H |
| —⟨⟩ | H |

There are obtained the following benzopteridines:

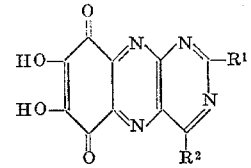

| $R^1$ | $R^2$ |
|---|---|
| OH | $CH_3$ |
| H | Cl |
| Cl | $CH_3$ |
| $CH_3$ | H |
| $CH_3$ | $CH_3$ |
| $SCH_3$ | H |
| $OC_2H_5$ | $CH_3$ |
| $NHCH_3$ | H |
| $N(CH_3)_2$ | H |
| —NH—⟨⟩ | H |
| —NH—⟨⟩—Br | H |
| —⟨⟩ | H |

The procedure of Example 1 is used to convert the above benzopteridines and those of Examples 2 to 6 into the corresponding sodium, potassium, lithium, magnesium, ammonium, methylammonium, ethylammonium, n-hexylammonium, benzylammonium and dibenzylethylenediammonium salts.

In evaluating the instant compounds for pharmacological activity, they are tested in vivo by standard methods with the following results.

In a test for anti-inflammatory activity in rats, derived from Winter et al., Proc. Soc. Exp. Biol. and Med., 111, 544 (1962) and Buttle et al., Nature, 179, 629 (1957), the ability of the compound to inhibit experimentally-induced edema in the hind paw of the animal is assayed.

Male Sprague-Dawley rats, 120–165 g., are used. The compound is administered intraperitoneally (I.P.) as a solution or suspension in physiological saline (plus 1 drop of emulsifier) in a volume of 10 ml./kg. Each compound is given to 5 rats and vehicle alone is administered to 5 more rats as a control. Thirty minutes after drug administration, edema is induced by an injection of 0.05 ml. of a 1% carrageenin solution into the subplantar tissue of the rat's right hind paw. Paw volume is then immediately measured volumetrically with a plethysmograph and again 3 hours later. The mean volume of swelling for the control group is calculated and compared to the test groups. Compounds that inhibit swelling approximately 20% as compared to controls are considered active. Inhibition is calculated by the formula:

Percent inhibition=

$$\frac{\text{mean vol. swelling of control} - \text{mean vol. swelling of test}}{\text{mean vol. swelling of control}} \times 100$$

In this test, 4,7,8-trihydroybenzo[g]pteridine-6,9-dione at 50 mg./kg., I.P., caused 65% inhibition and was active.

We claim:
1. A compound of the formula:

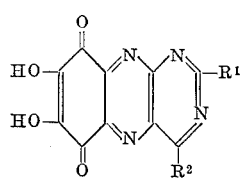

wherein $R^1$ is hydrogen, hydroxyl, phenyl, halo, (lower)alkyl, (lower)alkoxy, (lower)alkylthio, mono(lower)alklyamino, di(lower)alkylamino, cyclo(lower)alkylamino or halophenylamino; and $R^2$ is hydrogen, hydroxyl, halo or (lower)alkyl; or a non-toxic, pharmaceutically-acceptable salt of said compound with a base.

2. A compound as defined in claim 1 which is 4,7,8-trihydroxybenzo[g]pteridine-6,9-dione.

References Cited

UNITED STATES PATENTS 3,002,974   10/1961   Petering _____ 260—251.5

ALEX MAZEL, Primary Examiner

R. V. RUSH, Assistant Examiner

U.S. Cl. X.R.

424—251